June 18, 1929.  A. ABRAMSON  1,718,099
POWER TRANSMISSION MECHANISM FOR THE DRIVING
WHEELS OF MOTOR VEHICLES
Filed Sept. 18, 1926   2 Sheets-Sheet 1

Inventor:
Alexander Abramson
By Emil Bonnelycke
Attorney

June 18, 1929.  A. ABRAMSON  1,718,099
POWER TRANSMISSION MECHANISM FOR THE DRIVING
WHEELS OF MOTOR VEHICLES
Filed Sept. 18, 1926  2 Sheets-Sheet 2
Fig. 3.
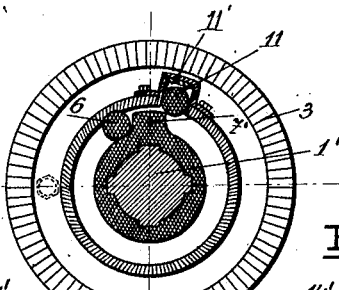
Fig. 4.  Fig. 6.
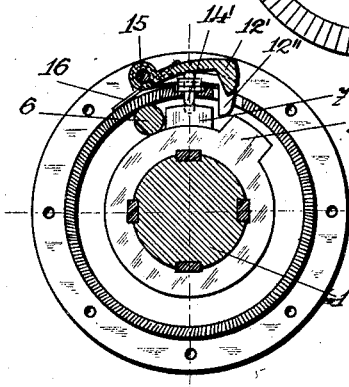 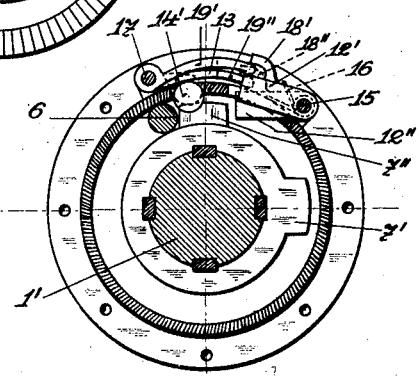
Fig. 5.  Fig. 7.
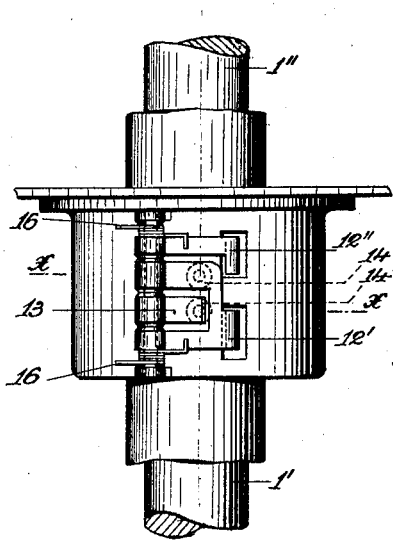 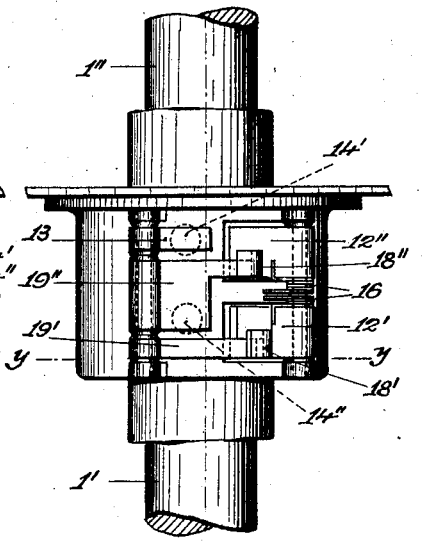
Inventor:
Alexander Abramson
By Emil Bönnelycke
Attorney Patented June 18, 1929.

1,718,099

UNITED STATES PATENT OFFICE.

ALEXANDER ABRAMSON, OF PRAGUE, CZECHOSLOVAKIA.

POWER-TRANSMISSION MECHANISM FOR THE DRIVING WHEELS OF MOTOR VEHICLES.

Application filed September 18, 1926, Serial No. 136,314, and in Czechoslovakia January 16, 1926.

In motor vehicles a so-called differential gear is used for the purpose of compensating for the differences in the number of revolutions of the two driving wheels. The present invention relates to a device which is designed to replace the usual differential gear, and is particularly adapted for use in motor vehicles.

According to the invention, the driven wheels are secured to a divided shaft, whose inner, juxtaposed ends have securely fixed to them stop members, both adapted to be engaged by a common driving member fixed to a driving wheel. The invention also contemplates the provision of means for holding one of the stops in engagement with the driver when the other stop had advanced beyond the driver, due to its shaft part having traveled at a faster speed than the other shaft part. There are other features of structure in the invention, all of which will be fully described and claimed.

It has heretofore been proposed to provide such a differential at the abutting ends of a divided shaft, and in such gears, there is a member fixed to each shaft part, and two cooperating driving elements, one for each driven member on each shaft part. As will be seen, my invention differentiates from such prior proposals in having a single driving member common to both the stops which it drives. As a result of this feature, it is possible to build a differential which is lighter and stronger than gears heretofore proposed, and has fewer parts to assemble, become worn or get out of order.

In the accompanying drawings:

Fig. 3 is a cross section of a differential illustrating an additional feature of the invention.

Figs. 4 and 5 are respectively a cross section and an elevation of a modified form of gear, and Figs. 6 and 7 are similar views of a still further modification.

Figure 1:
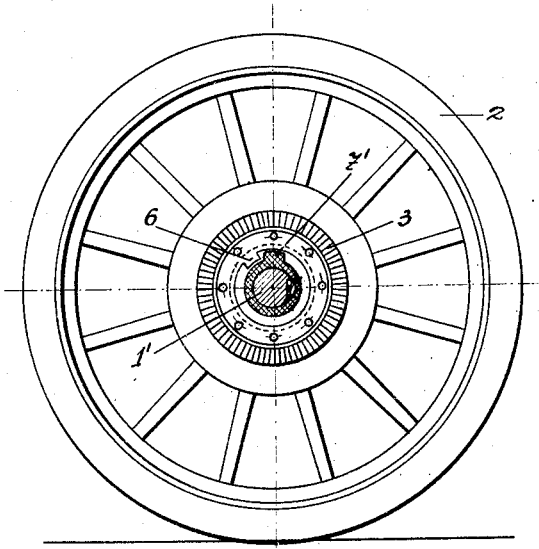
Figure 1 is a view showing the wheel of a motor car in elevation, and the differential of the present invention in cross section.
Figure 2:
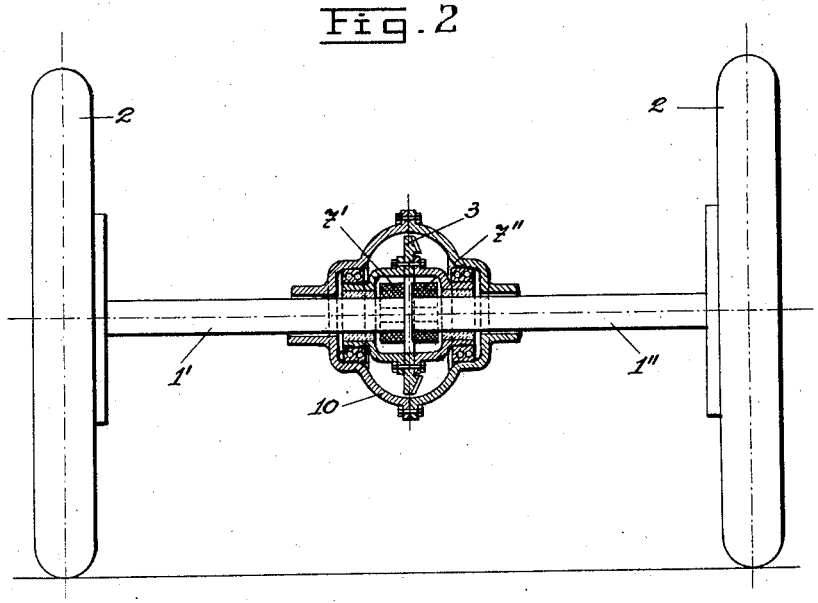
Fig. 2 is a longitudinal section of the differential.

In the construction according to Figs. 1 and 2, each of the two wheels 2 is keyed or otherwise secured to its shaft part 1' or 1". The driven members 7' and 7" are secured each to one shaft part, and the driver 6 is secured to the driving wheel 3 which floats on the divided shaft 1', 1". The whole driving gear, like the usual differential gear, can be mounted in a closed casing 10 at the middle of the divided shaft.

The driven members or stops 7' and 7" are both engaged by the driver 6 and driven thereby in the normal straight running of the vehicle. If one of the stops 7', 7" should be in advance of the other at the time of starting rotation of the driving wheel 3, the wheel 2 driven from the rearwardly positioned stop may sometimes be skidded (when there is insufficient road surface friction) until the two stops are in alignment, when both wheels 2 will be driven, and start the vehicle.

In taking a curve, the outer wheel 2 will rotate faster than the inner wheel 2, and thus the stop for said outer wheel will move away from the driver 6. Differentiation in the rotation of the wheels is thus permitted.

In order to prevent a premature disengagement of the driver 6 from the driven stop part 7' or 7", it is advisable, as shown for instance in Figure 3, to keep the parts 6 and 7' or 7" in forcible engagement. In the construction illustrated, this is done by mounting in the driving wheel hub a locking member 11, for instance a ball, which is projected by a rubber pad 11' or the like, into the path of the driven stops 7' and 7" to allow separation of the stops from the driver only after the resilient force of the pad has been overcome.

The special constructions of Figs. 4 to 7 allow an alternate locking of the pairs of stops intended for driving the two road wheels. The stops 7' and 7" are keyed to the shaft parts within a casing to be engaged by a driving pin 6 secured to the casing. Locking pawls 12' and 12", which are pivoted to a pin 15 mounted on the casing, are adapted to engage in front of the stops 7' and 7", being held in engagement by means of the spring 16. In the casing wall are provided pawl-lifting devices 14' or 14" which may be constituted for instance by spring controlled balls or pins. When the stops 7' and 7" are in contact with the pin 6, they raise the lifting members 14' and 14" and render the locking keys 12' or 12" inoperative. When one of the stops 7' or 7" moves away from the driving pin 6, the corresponding lifting member 14' or 14" will fall, and with it also the locking pawl corresponding to the other stop 7' or 7", so that disengagement of this second stop from the driving pin 6 is prevented. In order to allow of this alternate action, the locking pawl 12' is operatively connected within the lifting device 14' (Fig. 5), and the pawl 12'' is operatively connected with the lifter 14'' by means of a lever 13.

In the construction according to Figures 6 and 7, the locking of the stops 7' or 7'' is effected by means of the locking members 12' and 12'' which are pivoted on the pin 15 mounted in the casing. This pin also pivotally supports one-armed levers 18' and 18'' which are operated by levers 19' and 19'' rotatable about the pin 17. These levers 19' or 19'' are alternately raised by the lifting devices 14' or 14'', securing the stops 7' and 7'', in such a manner that when for instance the stop 7' moves away from the driving pin 6, the other stop 7'' will be held fast by the falling of the locking member 12''.

I claim:

1. A differential transmission gear including a pair of aligned shaft parts, a stop on the inner end of each shaft part, a driving wheel adapted to rotate around the juxtaposed ends of the shaft parts, and a single driving projection rigidly secured to said wheel, and adapted to engage and drive both the stops.

2. A gear as claimed in claim 1, having means yieldably supported by the driving wheel and normally projecting in the path of the shaft stops to oppose separation of the stops from the driver.

3. A gear as claimed in claim 1, having a pair of locking members for the stops movably mounted on the hub of the driving wheel, and devices for moving each of said members, the device for moving the locking member of one stop being actuated by the other stop, and the device for moving the locking member of the other stop being actuated by the first stop.

In testimony whereof I affix my signature.

ENG. ALEXANDER ABRAMSON.